US007357747B2

United States Patent
Hamilton

(10) Patent No.: US 7,357,747 B2
(45) Date of Patent: Apr. 15, 2008

(54) APPARATUS FOR DIFFERENTIAL POWER DISTRIBUTION

(76) Inventor: James T. Hamilton, 4180 N. Pennsylvania Ave., Indianapolis, IN (US) 46205

( * ) Notice: Subject to any disclaimer, the term of this patent is extended or adjusted under 35 U.S.C. 154(b) by 258 days.

(21) Appl. No.: 11/324,898

(22) Filed: Jan. 4, 2006

(65) Prior Publication Data

US 2007/0155575 A1   Jul. 5, 2007

(51) Int. Cl.
   *F16H 48/06*   (2006.01)
(52) U.S. Cl. .................. 475/221; 475/18; 74/665 M; 74/665 N
(58) Field of Classification Search ............. 74/665 L, 74/665 M, 665 N; 475/221, 225, 18
   See application file for complete search history.

(56) References Cited

U.S. PATENT DOCUMENTS

| 4,762,022 | A | * | 8/1988 | Johnshoy ................. 475/221 |
| 4,783,023 | A | * | 11/1988 | Jupe ............................ 244/6 |
| 4,811,627 | A | * | 3/1989 | Mouille .................... 74/665 L |
| 4,895,052 | A | | 1/1990 | Gleasman et al. |
| 5,006,101 | A | * | 4/1991 | Truong ..................... 475/221 |
| 5,390,751 | A | | 2/1995 | Puetz et al. |
| 5,413,512 | A | | 5/1995 | Belenger |
| 6,066,012 | A | | 5/2000 | Nagle |
| 6,354,388 | B1 | | 3/2002 | Teal et al. |
| 6,361,123 | B1 | | 3/2002 | Hamilton |
| 6,554,729 | B2 | | 4/2003 | Gleasman et al. |
| 6,656,074 | B2 | * | 12/2003 | Andriani .................... 475/28 |
| 6,904,985 | B2 | | 6/2005 | Ferree et al. |

OTHER PUBLICATIONS

Chocholek, S.E., "The Development of a Differential for the Improvement of Traction Contol", © IMechE 1988, 12 pages.
"2.00 Planetary Gear Application & Derivation", © 1999, 2000, 2001 Martin L. Culpepper, 4 pages.

* cited by examiner

*Primary Examiner*—Ha D. Ho
(74) *Attorney, Agent, or Firm*—Maginot, Moore & Beck

(57) ABSTRACT

A steering drive mechanism utilizes a pair of planetary gear arrangements between the input (or engine drive shaft) and the output shafts driving each wheel of a vehicle. The input is supplied to each sun gear in equal magnitude but opposite direction to account for driving the left or right wheels. The output shafts are connected to the planet carriers. In normal straight line driving, the ring gears are held fixed. The drive mechanism further comprises a steering motor that drives a steering gear that meshes with each ring gear. When the steering motor is activated, the steering gear rotates each ring gear in the same direction, so that the ring gear for one side increases the speed of the planet carrier and output shaft, while the ring gear for the opposite side decreases the output shaft speed.

16 Claims, 2 Drawing Sheets

APPARATUS FOR DIFFERENTIAL POWER DISTRIBUTION

BACKGROUND

The present invention relates to power transmission systems, such as the drive train of a vehicle, having at least two outputs from a single input. More particularly, the invention concerns a differential arrangement between the input and the outputs.

In a typical drive train, such as for a vehicle, the output shaft from the power source (i.e., engine or motor) is coupled to two drive axles through a differential. Each drive axle provides power to a separate prime mover, such as a vehicle wheel or propeller. The differential was developed to perform two primary functions, namely to transmit power from a single source to two drive axles and to permit independent rotation of the two driven axles. This latter function accounts for the differential rotational speeds of the two drive axles that may occur as a result of variations in wheel rolling radii and/or during a turn. Of course, it is known that as a wheeled vehicle turns, the outboard wheel must travel farther, and therefore faster, than the inboard wheel. The differential accounts for this velocity difference by diverting more power to the outboard wheel, thereby driving that wheel faster than the inboard wheel.

In the course of development of automotive differentials, the need for traction management was recognized. One difficulty with a conventional open differential is that it is not capable of delivering additional torque to a non-slipping wheel when one drive wheel loses traction. This problem has been addressed by modified differentials, such as the limited slip differential and the Torsen differential. The typical limited slip differential utilizes friction clutches to oppose the transfer of torque between drive axles. The Torsen differential provides torque proportioning characteristics between drive axles. The Torsen differential utilizes an Invex gearing configuration to control the generation of frictional torques so that the torque differential is proportional to the torque provided to the drive train.

These prior differentials are reactive devices, meaning that they react to changes in the speed and torque needs of the driven axles. There is a desire in certain applications to positively control the difference in rotational speeds between the two output shafts or axles. One such application is to provide steering in a multi-propeller drive system such as for a boat or an airplane. In this application, a modified differential system allows for increased or decreased rotation of each output shaft. An example of one such modified differential system is found in U.S. Pat. No. 6,554,729 to Gleasman et al. In this system, each output shaft is coupled to the input through an orbital gear set. Steering control is provided through a worm gear arrangement that controls the orbital rotation of the gear set. When the worm gear arrangement prevents orbital rotation, power is transmitted from the input shaft to the output shaft only by the rotation of each cluster gear within the orbital gear set. Rotation of the worm gear controls the orbital rotation of the cluster gears to either add to or subtract from the output shaft.

One disadvantage of the system shown in the '729 Patent and in other similar systems is that gearing arrangement is difficult to package, or more particularly that the envelope required to house the system is too large for many applications that might benefit by the controllable differential rotation characteristics of the system. Another disadvantage is that these systems are mechanically inefficient due to gear backlash, contact problems between worm gears and the like. There is a need for a differential-based steering system that addresses these disadvantages.

SUMMARY OF THE INVENTION

In accordance with one embodiment of the invention, an apparatus is provided for differential rotational power distribution from a power source that comprises an input shaft connected to the power source to receive rotational power therefrom and a pair of output shafts. The apparatus further comprises a pair of planetary gear sets, each including a corresponding sun gear, ring gear and planet carrier supporting a plurality of planet gears. The sun gear of each of the planetary gear sets is coupled to the input shaft to receive power therefrom and rotationally drive the corresponding plurality of planet gears. The planet carrier of each of the planetary gear sets is rotated by rotation of the corresponding planet gears and is coupled to a corresponding one of the pair of output shafts to transmit rotational power thereto.

In one feature of the invention, the apparatus includes a motor driving an input gear that is coupled to the ring gear of each of the planetary gear sets. The input gear is configured to drive the ring gears so that the ring gear rotation in one of the pair of planetary gear sets increases the rotational speed of the corresponding planet carrier while the ring gear rotation in the other of the pair of planetary gear sets decreases the rotational speed of the corresponding other planet carrier. The motor can be selectively operated so that in an inactivated state, the motor and input gear hold both ring gears against rotation. In this state, the output shafts rotate at substantially the same speed based solely on rotation of the sun gears. The motor can also be activated to rotate the ring gears in the manner just described.

In one aspect of the apparatus, the input shaft directly drives the sun gear of one of the pair of planetary gear sets and indirectly drives the sun gear of the other of the planetary gear sets through a transfer gear arrangement. The transfer gear arrangement may include a transfer drive gear coupled to the input shaft and a transfer driven gear coupled to the sun gear of the other of the planetary gear sets and in meshed engagement with the transfer drive gear.

In a preferred embodiment, the input gear is in direct meshed engagement with the ring gear of each of the pair of planetary gear sets. Thus, rotation of the input gear results in rotation of the ring gears in the same direction. The motor is preferably a reversible electric motor so that it can be rotated in one direction to increase the output of one output shaft, or in the opposite direction to increase the output of the other output shaft. Alternatively, the motor may be a reversible hydraulic motor.

In a further embodiment of the invention, the apparatus for differential power distribution may be used as a steering apparatus for a vehicle having an engine with a drive shaft and at least two drive wheels. In this embodiment, the output shafts driven by each planetary gear set are connected to corresponding drive wheels. The motor and input, or steering, gear may then be used to increase the rotational speed of the outboard wheel during a vehicle turn, while simultaneously decreasing the rotational speed of the inboard wheel. When straight-ahead driving is resumed, the steering motor is de-activated and the planetary gear sets directly translate the drive shaft speed to the two output shafts through the sun and planet gears.

It is one object to provide an apparatus capable of differential power distribution from a common input to at least two outputs. It is a more specific object to adapt this system for use in augmenting vehicle steering.

One benefit of the present invention is that it performs the function of standard or specialized drive train differentials with much fewer and less complicated parts. A further benefit is that this differential function is performed with only minimal reduction in total power to the drive wheels of a vehicle.

Other objects and benefits of the invention will be appreciated from the following written description taken together with the accompanying figures.

DESCRIPTION OF THE PREFERRED EMBODIMENTS

Figure 1:
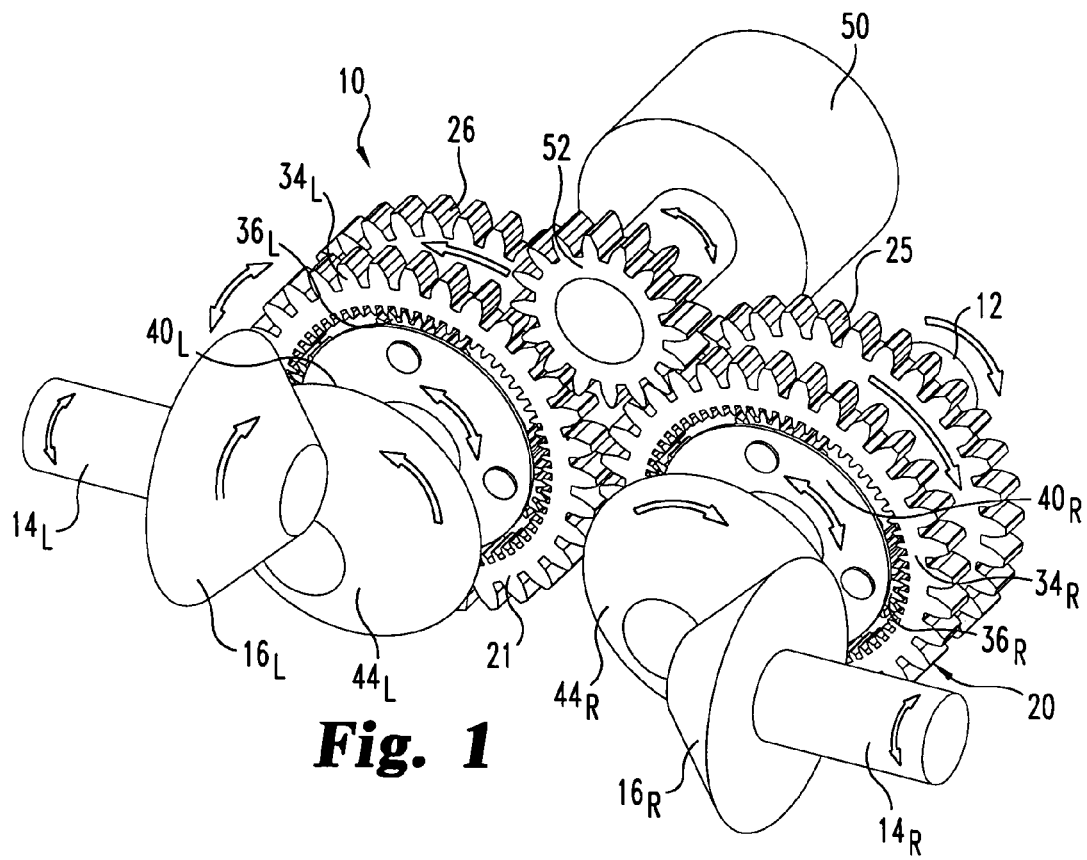
FIG. 1 is a perspective view of a differential-based steering system according to one embodiment of the invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In accordance with one embodiment of the invention, a steering drive mechanism 10 shown in FIG. 1 is coupled to a power source, such as an automotive engine, by an input shaft 12. Power is provided to the prime movers, such as the vehicle wheels, by a pair of output shafts 14R and 14L connected to corresponding output bevel gears 16R and 16L. The mechanism 10 further comprises left and right planetary gear sets 20 and 21, respectively, which are coupled between the input shaft 12 and the corresponding output bevel gears.

Figure 4:
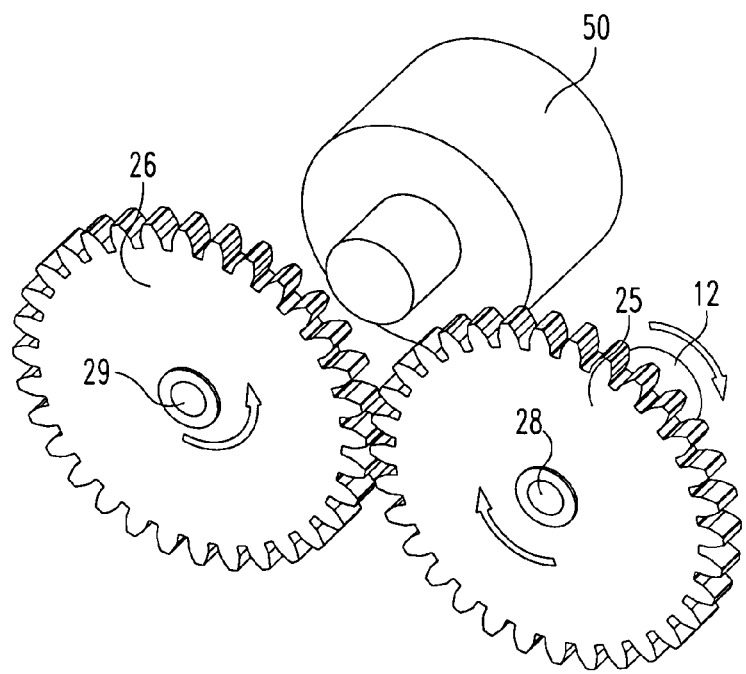
FIG. 4 is a still further cut-away view of the system shown in FIG. 3, with the planetary gear sets removed for clarity.

Referring to the cut-away view of FIG. 4, it can be seen that the input shaft 12 is connected to a transfer drive gear 25 that is part of the right side of the drive train. The transfer drive gear meshes with a transfer driven gear 26 that is part of the left side of the drive train. In the preferred embodiment, the two gears 25 and 26 are spur gears with the same number of teeth so that they rotate at the same speed but in opposite directions.

The transfer drive gear 25 includes a sun gear shaft 28 projecting therefrom, while the transfer driven gear 26 includes a similar shaft 29. The right side sun gear shaft 28 is connected to the sun gear 32R of the right side planetary set 20. Likewise, the left side sun gear shaft 29 is connected to the sun gear 32L of the left side planetary gear set 21. Thus, it should be appreciated that the two sun gears are driven at the same speed but in opposite directions by as the transfer drive gear 25 and transfer driven gear 26 are rotated by the input shaft 12.

Figure 3:
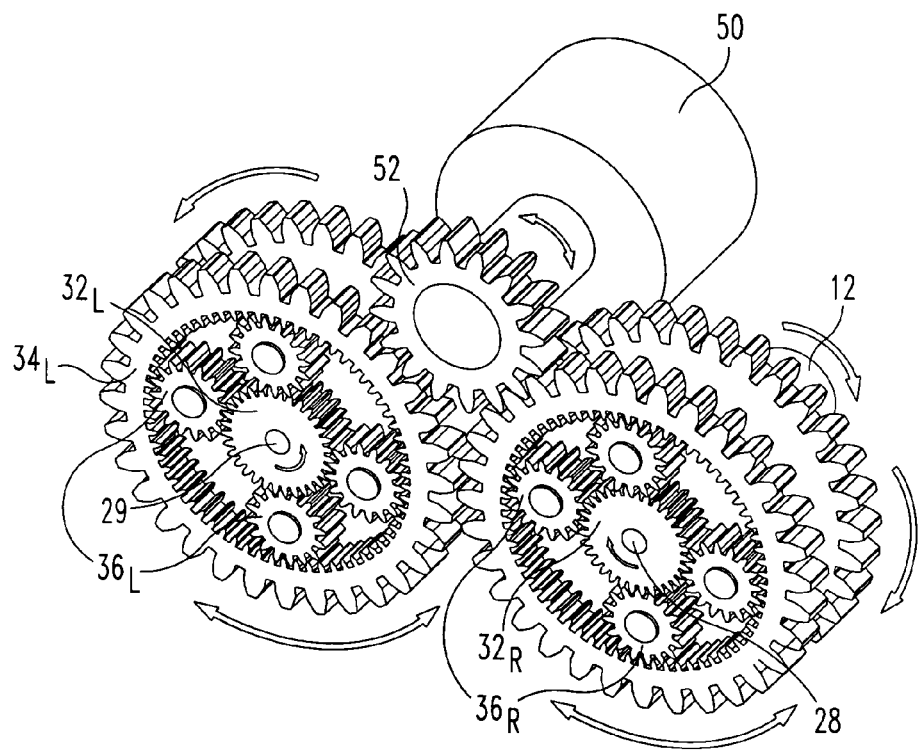
FIG. 3 is a further cut-away view of the system shown in FIG. 2, with the planet carriers removed for clarity.

As with a typical planetary gearing system, the planetary gear sets 20, 21 include corresponding ring gears 34R, 34L, and corresponding planet gears 36R, 36L, as shown in the cut-away view of FIG. 3. Each of the planet gears 36R, 36L meshes with the corresponding sun and ring gears. In the illustrated embodiment, four such planet gears are provided with each gear set, although three or more such gears may be utilized depending upon the size and power requirements for the steering drive mechanism 10.

Figure 2:
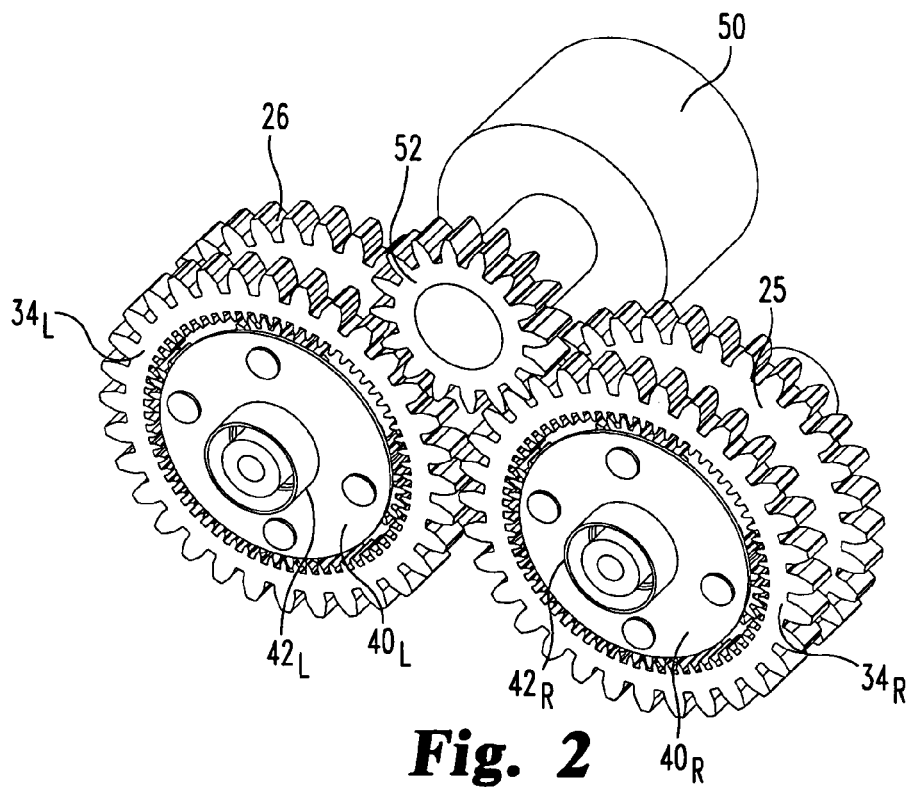
FIG. 2 is a cut-away view of the system shown in FIG. 1, with the output bevel gear arrangement removed for clarity.

Each planetary gear set includes a planet carrier 40R, 40L that rotatably supports the corresponding planet gears in a conventional fashion, as shown in FIG. 2. Each carrier includes a carrier shaft 42R, 42L (FIG. 2) that is connected to a corresponding input bevel gear 44R, 44L (FIG. 1). As shown in FIG. 1, the input bevel gears 44R, 44L mesh with the right and left side output bevel gears 16R, 16L to provide power to the two output shafts 14R, 14L.

It can be appreciated from the rotation direction arrows in FIG. 1, that a clockwise rotation of the input shaft 12 yields a clockwise rotation of the right output shaft 14R and an opposite rotation of the left output shaft 14L in order to ensure that the driven wheels rotate in the same direction to propel the vehicle. This opposite rotation relationship is enforced by the meshed input drive and transfer gears 25, 26 that rotate in opposite directions along with the corresponding sun gears 32R, 32L connected to the input gears.

It can be further appreciated that in this planetary arrangement, the sun gears 32R, 32L provide the input to the arrangement. The ring gears 34R, 34L provide the reaction so that the power output from the mechanism 10 is through the planet gears 36R, 36L. It is therefore known that the magnitude of the rotational speed of the planet carriers 40R, 40L and associated output bevel gears 16R, 16L is given by the following relationship:

$$\omega_c = \frac{\omega_S D_S \pm \omega_R D_R}{D_S + D_R}$$

where $\omega_c$ is the rotational speed of the planet carrier,
$\omega_S$ is the rotational speed of the sun gear (which is the same as the rotational speed of the input shaft 12),
$\omega_R$ is the rotational speed of the ring gear,
$D_S$ is the diameter or number of teeth of the sun gear,
$D_R$ is the diameter or number of internal teeth of the ring gear, and
± means that the ring gear term of the equation may be added or subtracted from the sun gear component, based on the direction of rotation of the ring gear relative to the sun gear. In other words, when the ring gear is rotating in the same direction as the sun gear (i.e., clockwise for the right side of the mechanism), the ring gear term is added. When the ring gear is rotating in the opposite direction (i.e., counter-clockwise), the ring gear term is subtracted.

In the predominant operating condition, power is evenly distributed to the two output shafts 14R, 14L. In this case, the ring gears 34R, 34L are held fixed and non-rotating. Thus, the above equation reduces to the rotational speed of the carrier being simply a function of the speed of the sun gear and the ratio of the sun gear diameter to the sum of the diameters of the sun gear and the ring gear. By way of example, if the sun gear has 32 teeth and the ring gear internal teeth number 64, then the output speed $\omega_c$ will be 32/(32+64) or ⅓ of the input speed $\omega_S$.

As thus far described, the planetary gear sets 20, 21 operate to transfer power equally to both the right and left output shafts 14R, 14L. However, in accordance with one aspect of the invention, the ring gears 34L and 34R are driven by an input or steering gear 52 (FIG. 1) powered by a steering motor 50. Since the steering gear meshes simultaneously with both ring gears, the two ring gears are driven at the same speed but in opposite directions.

The steering motor 50 is preferably a controllable reversible motor, and most preferably an electric motor. The maximum rotational output speed of the motor depends upon the maximum desired ring gear rotational speed and the gear ratio between the steering gear 52 and the ring gears 34R, 34L. In the illustrated embodiment, the steering gear has 16 teeth, while the outer teeth of each ring gear number 32, which leads to a gear reduction of ½. In a specific embodiment, the ring gear may be driven at 1500 rpm, so the motor 50 should have a maximum speed of 3000 rpm. More specifically, the maximum output speed of the motor is a function of the input speed to the steering mechanism 10 to ensure that the steering motor does not overdrive the output It can be appreciated from the above equation that the ring gear rotation contributes to the rotational speed of the carrier ($\omega_c$) by the ratio of the ring gear internal diameter or number of teeth to the sum of the ring and sun gear diameters. In the specific example, that ratio is 64/(64+32) or ⅔. (As explored above, the sun gear rotation contributes to the rotational speed of the carrier by a ratio of 32/(64+32) or ⅓). At a maximum ring gear speed of 1500 rpm, this rotation can add or subtract ⅔*(1500) or 1000 rpm to or from the carrier rotational speed.

In one feature of the invention, since the ring gears are coupled to rotate in opposite directions, when the ring gear rotation is added to the planetary gear set of one side, it is subtracted from the other side. Thus, in the example above, if the right side ring gear 34R is driven to rotate clockwise (i.e., the same direction as the right sun gear 32R) then the ring gear rotation would be added to the sun gear rotation through the planet gears 36R, according to the expressed gear ratios to increase the rotational speed of the output shaft 14R. Since the left side ring gear 34L is driven in the opposite direction by the steering gear 52, it will rotate in the opposite direction and counter to the rotation of the left side sun gear 32L. Thus, the counter-clockwise rotation of the right ring gear means that the ring gear rotation will be subtracted from the sun gear rotation through the planet gears 36L, again in relation to their respective gear ratios.

It can thus be appreciated that the steering gear 52 and motor 50 provide a means for performing a high speed turn without appreciable sacrifice in the vehicle speed around that turn. By way of example, assume that a high performance car engine is driving the input shaft 12 at 9000 rpm. The input shaft drives sun gear 32R in the clockwise direction at the same speed, and also drives the transfer gears 25, 26 at the same speed. Rotation of the transfer driven gear 26 directly drives the left sun gear 23L at the same speed as the right sun gear, albeit in a counter-clockwise direction. When no steering is applied, the ring gears 34R, 34L are fixed so the planet carriers 40R, 40L are driven according to the gear tooth ratio between the sun and ring gears (⅓ in the specific example). Thus, the output shafts 14R, 14L are rotating at 9000/3 or 3000 rpm when no steering is applied.

In a left-hand turn, the outboard wheel, i.e., the right wheel, must rotate faster than the inboard (i.e., left) wheel. To execute a left-hand turn the steering motor 50 may be activated to rotate the steering gear 52 in the same direction as the right sun gear 32R, i.e., the clockwise direction. Thus, the steering gear 52 must be rotated in the counter-clockwise direction since the right ring gear 34R meshes directly with the steering gear. Since the left ring gear 34L also meshes directly with the steering gear, the left ring gear will also rotate in the clockwise direction, which is opposite the counter-clockwise rotation of the left sun gear 32L (see FIG. 3).

If the motor 50 is running at 1000 rpm, then both ring gears rotate at the steering motor speed reduced by the gear ratio between the steering gear and the ring gears. In the specific example, the steering gear has 16 teeth while the ring gear has 64 teeth, so that the gear ratio is 16/64 or ¼. Thus, the ring gears 34R, 34L will driven by the steering motor 50 at 1000/4 or 250 rpm in the clockwise direction. Applying the above equation, the rotational speed of the right carrier, and ultimately the right output shaft 14R, is given by [9000(32)+250(64)]/[32+64], or 3167 rpm, which is greater than the output shaft speed in a straight line driving condition. On the other hand, the rotational speed of the left carrier and output shaft 14L is [9000(32)−250(64)]/[32+64], or 2833 rpm, which is less than the output shaft speed in a straight line driving condition.

It can be appreciated that driving the steering motor 50 in the opposite (clockwise) direction will ultimately reduce the speed of the right output shaft 14R and increase the speed of the left output shaft 14L to effect a right-hand turn. It can also be appreciated that the amount of increase or decrease in the output shaft speed is based on the ring gear rotational speed multiplied by the ratio of the ring gear diameter to sum of the diameters of the ring and sun gears. The ring gear speed is in turn dictated by the steering motor rotational speed and the gear ratio between the steering gear and the ring gear. Thus, the amount of increase/decrease in the rotational speed of the output shafts 14R, 14L mathematically reduces to the relationship between the diameter of the steering gear to the combined diameter of the ring and sun gears, multiplied by the steering motor speed. Thus, the above equation for the rotational speed of the carriers 40R, 40L (which is the same as the speed of the output shafts 14R, 14L) becomes:

$$\omega_c = \frac{\omega_S D_S}{D_S + D_R} \pm \frac{\omega_{SG} D_{SG}}{D_S + D_R}$$

where $\omega_c$ is the rotational speed of the planetary carrier and ultimately the output shafts 14R, 14L,
  $\omega_S$ is the rotational speed of the sun gear (which is the same as the rotational speed of the input shaft 12),
  $\omega_{SG}$ is the rotational speed of the steering gear 52,
  $D_S$ is the diameter or number of teeth of the sun gear,
  $D_{SG}$ is the diameter or number of teeth of the steering gear, and
  ± means that the steering gear rotation is either added to or subtracted from the sun gear rotation, as explained above.

The motor 50 includes appropriate control circuitry (not shown) that allows the operator to activate or de-activate the motor, and, in the preferred embodiment, to control the speed and direction of rotation of the motor. When the motor is de-activated, the motor and steering gear 52 hold the ring gears 34R, 34L fixed against rotation so there is no differential power or rotation between the two planetary gear sets 20, 21. Thus, it is contemplated in one specific embodiment that the control circuitry includes an operator input device, such as a joystick or control lever, that may be selectively operated to vary the amount of steering input from the motor (as described below).

In another specific embodiment, the control circuitry is integrated into the steering mechanism or steering control of a motor vehicle so that a command to the vehicle steering mechanism results in a comparable command to the steering motor 50. The steering motor control circuitry may be integrated into existing electronic controls for the vehicle steering, or may incorporate an angular position sensor on the steering wheel shaft. The steering motor command may be a function of the current engine speed, or more appropriately the current vehicle ground speed, and the degree of the steering command. The steering motor command may be a direct function of the vehicle speed and degree of turn, since the relative rotational speed of the inboard and outboard wheels is fixed and determinable. In some instances it may be desirable to over or under drive the outboard or inboard wheels, so it may be desirable to permit an operator to adjust the steering motor command accordingly.

It is understood that the steering drive mechanism of the present invention provides differential rotational power output between a pair of output shafts. The present invention has practical application in a motor vehicle where it is desirable to provided differential rotational power output to the right and left driving wheels of the vehicle. The drive mechanism 10 may be used in four-wheel drive vehicle with a separate drive mechanism 10 for the front and rear wheel sets. In the case of a four-wheel drive vehicle, it is important that the steering input provided by the steering motors 50 be synchronized so that the front outboard wheels do not rotate at a different speed from the rear outboard wheels. Thus, in one specific embodiment, a single motor may be geared to drive steering ears 52 for the front and rear wheel sets. In another specific embodiment, separate motors maybe provided with appropriate electrical synchronization to ensure that the rotational speeds of the two motors are substantially equal.

In other applications, differential power may be required for more than two outputs. Thus, the steering gear 52 of the present invention may be coupled to ring gears of more than two planetary gear sets. In one alternative, for instance, two other gear sets such as gear sets 28, 29 may be positioned above the steering gear 52 depicted in FIG. 1. The sun gears of these additional gear sets may be coupled to the input shaft 12 through corresponding driven transfer gears, like the driven gear 26.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in the preferred embodiment, the steering motor 50 simultaneously drives both ring gears 34R, 34L at the same rotational speed because a common steering gear 52 meshes with both. In one alternative, the steering gear 52 may incorporate a second steering gear having a different number of teeth or diameter from the gear 52. In this embodiment, one side of the drive mechanism would be slightly offset so that the two steering gears can fit on the common output shaft of the steering motor 50. This alternative allows for a different impact on the output speed from right side to left side. For instance, the left side ring gear 34L may mesh with a steering gear having 12 teeth, instead of the 16 teeth of the existing steering gear 52. Thus, the steering input from motor 50 will have a reduced effect on the left side output than the right side, which may be beneficial for racing on an oval in which only left-turns are being made.

In yet another alternative, the steering gear 52 may incorporate multiple gears that can be shifted to mesh with both ring gears 34R, 34L. Thus, the steering gear may include one 16 tooth gear, a 12 tooth gear and a 10 tooth, with the understanding that meshing the smaller steering gear produces a lesser effect on the rotational speed of the output shafts for a given steering motor speed. With this approach, the steering motor may be a single speed motor and the adjustments in steering input would then be accomplished by selecting which steering gear to use. The steering gear selection may be accomplished using a clutch fork mechanism to shift the steering gears into or out of synchronization with the ring gears.

In the illustrated embodiment, the steering gear 52 is situated between the two ring gears 34R, 34L. Alternatively, the steering gear may be arranged to contact only one ring gear. In this alternative, an idler gear would be disposed in meshed engagement between the two ring gears so that the two gears will rotate in the same direction when the first ring gear is driven by the steering gear.

In accordance with the illustrated embodiment, the two ring gears 34R, 34L rotate in the same direction so that the rotation of one ring gear will be increase the planet carrier rotational speed while rotation of the other ring gear will decrease the planet carrier speed. The rotational directions are based on the two sun gears 32R, 32L and the corresponding output shafts and the corresponding output shafts 14R, 14L rotating in opposite directions. However, in certain arrangements the two output shafts may rotate in the same direction and other gearing may be provided to rotate the drive wheels uniformly. With these arrangements, the two sun gears 32R, 32L will rotate in the same direction so that an idler gear is required between the two transfer gears 25, 26. Moreover, with these arrangements, the two ring gears must be driven in opposite directions so that one gear will be additive and the other ring gear will be subtractive for its respective planetary gear set. In this case, the steering gear 52 may be arranged to mesh with only one of the ring gears, such as ring gear 34L and the two ring gears 34R, 34L may directly mesh to ensure equal but opposite rotation between the two gears. This modification to the steering gear arrangement preserves the ability to add rotational speed to one planet carrier and associated output shaft, while reducing rotational speed of the other carrier and output shaft.

In the preferred embodiment, the steering motor 50 is an infinitely variable reversible electric motor. Appropriate control circuitry may be provided to allow discrete control of the rotational speed of the motor. Other motors are contemplated, including single speed motors, motors capable of discrete finite speed variations and non-electric motors, such as a reversible hydraulic motor. The maximum rotational speed of the steering motor 50 is preferably calibrated to the maximum input speed provided to the apparatus. In other words, the steering speed must not be so great as to overpower the sun gear rotational input to the planet gears.

What is claimed is:

1. An apparatus for differential rotational power distribution from a power source, comprising:
   an input shaft connected to the power source to receive rotational power therefrom;
   a pair of output shafts;
   a pair of planetary gear sets, each including a corresponding sun gear, ring gear and planet carrier supporting a plurality of planet gears, wherein the sun gear of each of said planetary gear sets is coupled to said input shaft to receive power therefrom and rotationally drives the corresponding plurality of planet gears, and further wherein the planet carrier of each of said planetary gear sets is rotated by rotation of the corresponding planet gears and is coupled to a corresponding one of said pair of output shafts to transmit rotational power thereto;

a motor; and an input gear driven by said motor and coupled to the ring gear of each of said planetary gear sets to drive the ring gears so that the ring gear rotation in one of said pair of planetary gear sets increases the rotational speed of the corresponding planet carrier and the ring gear rotation in the other of said pair of planetary gear sets decreases the rotational speed of the corresponding other planet carrier.

2. The apparatus for differential rotational power distribution of claim 1, wherein said input shaft directly drives the sun gear of one of said pair of planetary gear sets and indirectly drives the sun gear of the other of said planetary gear sets through a transfer gear arrangement.

3. The apparatus for differential rotational power distribution of claim 2, wherein the transfer gear arrangement includes:

a transfer drive gear coupled to said input shaft; and a transfer driven gear coupled to the sun gear of said other of said planetary gear sets and in meshed engagement with said transfer drive gear.

4. The apparatus for differential rotational power distribution of claim 1, wherein said input gear is in direct meshed engagement with the ring gear of each of said pair of planetary gear sets.

5. The apparatus for differential rotational power distribution of claim 1, wherein said motor is a reversible electric motor.

6. The apparatus for differential rotational power distribution of claim 1, wherein said motor is an infinitely variable motor.

7. The apparatus for differential rotational power distribution of claim 1, wherein said motor is selectively operable and is configured in a de-activated state to hold said input gear and thereby hold the ring gears of said planetary gear sets stationary against rotation.

8. A steering apparatus for a vehicle having an engine with a drive shaft and at least two drive wheels, comprising:

a pair of output shafts, one each coupled to a corresponding drive wheel;

a pair of planetary gear sets, each including a corresponding sun gear, ring gear and planet carrier supporting a plurality of planet gears, wherein the sun gear of each of said planetary gear sets is coupled to the drive shaft of the engine to receive power therefrom and rotationally drives the corresponding plurality of planet gears, and further wherein the planet carrier of each of said planetary gear sets is rotated by rotation of the corresponding planet gears and is coupled to a corresponding one of said pair of output shafts to transmit rotational power thereto;

a steering motor; and a steering gear driven by said steering motor and coupled to the ring gear of each of said planetary gear sets to drive the ring gears so that the ring gear rotation in one of said pair of planetary gear sets increases the rotational speed of the corresponding planet carrier and the ring gear rotation in the other of said pair of planetary gear sets decreases the rotational speed of the corresponding other planet carrier.

9. The steering apparatus of claim 8, wherein the sun gear of one of said pair of planetary gear sets is directly driven by the drive shaft and the sun gear of the other of said planetary gear sets is indirectly driven by the drive shaft through a transfer gear arrangement.

10. The steering apparatus of claim 9, wherein the transfer gear arrangement includes:

a transfer drive gear coupled to the drive shaft; and a transfer driven gear coupled to the sun gear of said other of said planetary gear sets and in meshed engagement with said transfer drive gear.

11. The steering apparatus of claim 8, wherein said steering gear is in direct meshed engagement with the ring gear of each of said pair of planetary gear sets.

12. The steering apparatus of claim 8, wherein said motor is a reversible electric motor.

13. The steering apparatus of claim 8, wherein said motor is an infinitely variable motor.

14. The steering apparatus of claim 8, wherein said motor is selectively operable and is configured in a de-activated state to hold said steering gear and thereby hold the ring gears of said planetary gear sets stationary against rotation.

15. A method for steering the driven wheels of an engine-driven vehicle, comprising:

providing a pair of planetary gear sets between the engine drive shaft and a corresponding output shaft providing power to each driven wheel, each output shaft coupled to the planet carrier of the corresponding planetary gear set;

driving the sun gear of each of the planetary gear sets from the engine drive shaft in a given rotational direction to simultaneously drive the planet carrier and output shaft for each driven wheel; and selectively simultaneously rotating the ring gear of each planetary gear set so that the rotation of the ring gear of one planetary gear set increases the rotational speed of the corresponding planet carrier and output shaft and so that the rotation of the ring gear of the other planetary gear set decreases the rotational speed of the corresponding other planet carrier and other output shaft.

16. The method for steering of claim 15, further comprising selectively simultaneously holding the ring gear of each planetary gear set against rotation so that the rotational speed of each output shaft is substantially the same.

* * * * *